(12) United States Patent
Ito

(10) Patent No.: US 9,086,826 B2
(45) Date of Patent: Jul. 21, 2015

(54) INFORMATION PROCESSING APPARATUS, METHOD FOR CONTROLLING THE SAME, AND STORAGE MEDIUM

(75) Inventor: Yuki Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 747 days.

(21) Appl. No.: 13/236,318

(22) Filed: Sep. 19, 2011

(65) Prior Publication Data

US 2012/0092689 A1 Apr. 19, 2012

(30) Foreign Application Priority Data

Oct. 18, 2010 (JP) ................................. 2010-233581

(51) Int. Cl.
*G06F 3/12* (2006.01)

(52) U.S. Cl.
CPC ............ *G06F 3/1204* (2013.01); *G06F 3/1206* (2013.01); *G06F 3/1228* (2013.01); *G06F 3/1247* (2013.01); *G06F 3/1265* (2013.01); *G06F 3/1288* (2013.01)

(58) Field of Classification Search
USPC ........................................................ 358/1.13
See application file for complete search history.

(56) References Cited

U.S. PATENT DOCUMENTS

| | | | | |
|---|---|---|---|---|
| 2002/0085228 | A1* | 7/2002 | Yagita | 358/1.15 |
| 2003/0112456 | A1* | 6/2003 | Tomita et al. | 358/1.13 |
| 2006/0004963 | A1 | 1/2006 | Mattina | |
| 2006/0161658 | A1* | 7/2006 | Noguchi | 709/225 |
| 2009/0097053 | A1* | 4/2009 | Saito | 358/1.14 |
| 2009/0237724 | A1* | 9/2009 | Furuya | 358/1.15 |

FOREIGN PATENT DOCUMENTS

| | | | |
|---|---|---|---|
| CN | 1512426 | A | 7/2004 |
| CN | 1773456 | A | 5/2006 |
| CN | 100361080 | C | 1/2008 |
| CN | 101526889 | A | 9/2009 |
| JP | 2003-029947 | A | 1/2003 |
| JP | 2003-242105 | A | 8/2003 |
| JP | 2006-285840 | A | 10/2006 |
| JP | 2009-301127 | A | 12/2009 |

OTHER PUBLICATIONS

KR20080016278—abstract, Jang, Korea, Feb. 21, 2008.*

* cited by examiner

*Primary Examiner* — Fan Zhang

(74) *Attorney, Agent, or Firm* — Canon USA, Inc., IP Division

(57) ABSTRACT

An information processing apparatus may include a printer driver and a port monitor having a transmission unit, a reception unit, and a pull print command transmission unit. After a print instruction is made to edited electronic data, the printer driver receives and then transmits the electronic data to the port monitor without converting it into print data. The transmission unit receives the electronic data, specific information corresponding to an image forming apparatus, and a printing server uniform resource identifier (URI), and transmits the electronic data to a printing server based on the received printing server URI to cause the printing server to convert the electronic data into print data and a print data URI. The pull print command transmission unit transmits a pull print command including the print data URI received by the reception unit to the image forming apparatus based on the specific information.

7 Claims, 12 Drawing Sheets

FIG. 7

| DRIVER TYPE | CLOUD PRINTER DRIVER | CONVENTIONAL PRINTER DRIVER |
|---|---|---|
| IMAGE FORMING APPARATUS IP ADDRESS | 172.24.160.1 | 172.24.160.2 |
| PRINTING SERVICE URL | http://prt.srv.com/print/ | NONE |

```
<CreatePrintJobRequest>
    <PrintTicket>
        <DocumentProcessing>      ~ 801
            <Sides>OneSided</Sides>
            <MediaSizeName>iso_a4_210x297mm</MediaSizeName>  ~ 802
        </DocumentProcessing>
    </PrintTicket>
</CreatePrintJobRequest>
```

FIG. 8B

```
<SendDocumentRequest>
    <JobId>1</JobId>
    <DocumentDescription>
        <DocumentId>1</DocumentId>
        <Compression>None</Compression>
        <Format>application/octet-stream</Format>
    </DocumentDescription>
    <LastDocument>true</LastDocument>
    <DocumentData>
        [Data]       ~ 803
    </DocumenData>
</SendDocumentRequest>
```

FIG. 8C

```
<CreatePrintJobResponse>                                                    804
    <JobId>1</JobId>
    <DocumentUrl>http://prt.srv.com/data/5846759561318635695</DocumentUrl>
    <SettingUrl>http://prt.srv.com/setting/5846759561318635695</SettingUrl>
</CreatePrintJobResponse>
                                                                            805
```

FIG. 8D

```
<AddDocumentRequest>
    <JobId>1</JobId>
    <DocumentDescription>
        <DocumentId>1</DocumentId>
        <Compression>None</Compression>
        <Format>application/octet-stream</Format>
    </DocumentDescription>                                                  806
    <LastDocument>true</LastDocument>
    <DocumentUrl>http://prt.srv.com/data/5846759561318635695</DocumentUrl>
    <SettingUrl>http://prt.srv.com/setting/5846759561318635695</SettingUrl>
</AddDocumentRequest>
                                                                            807
```

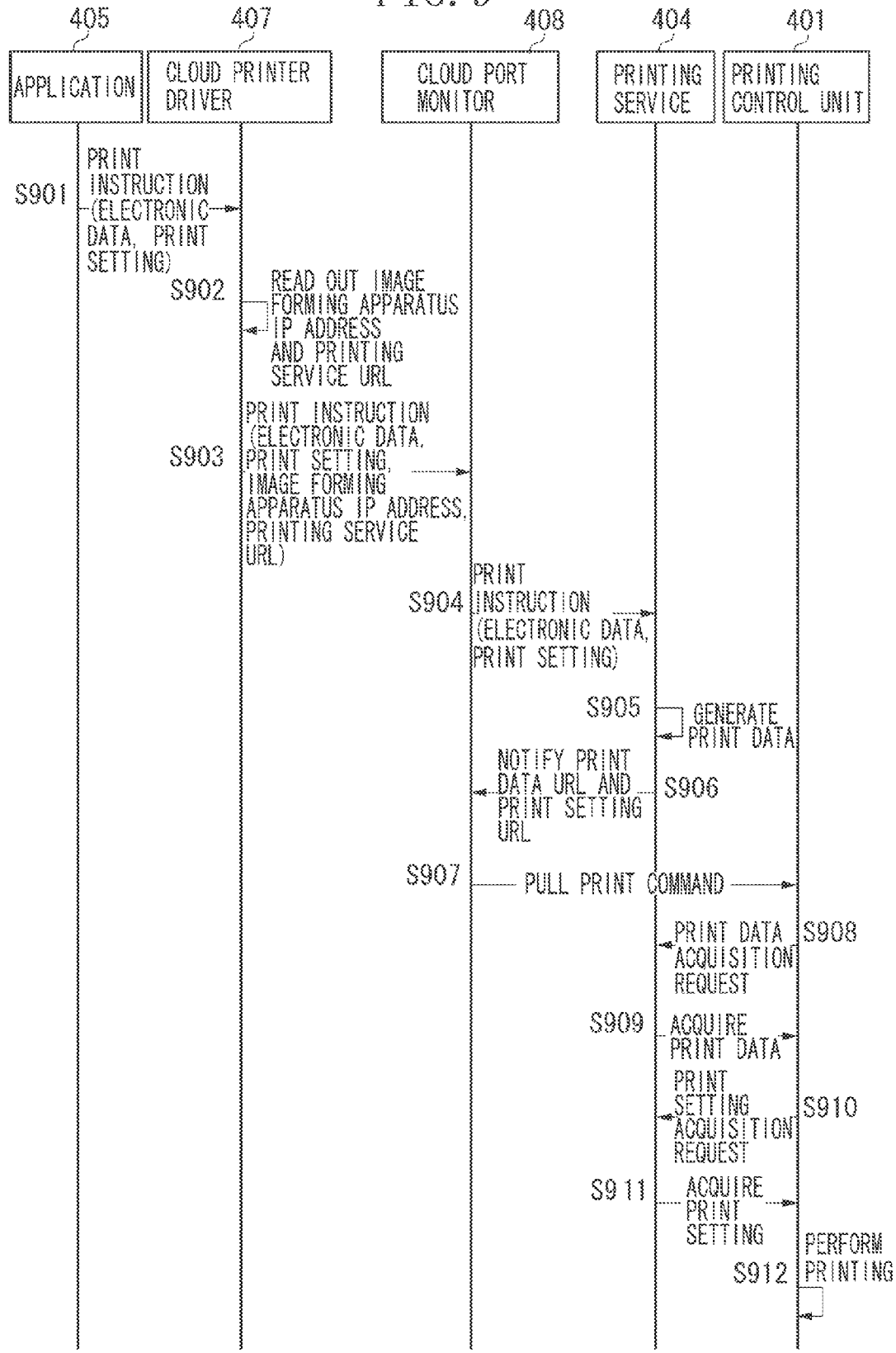

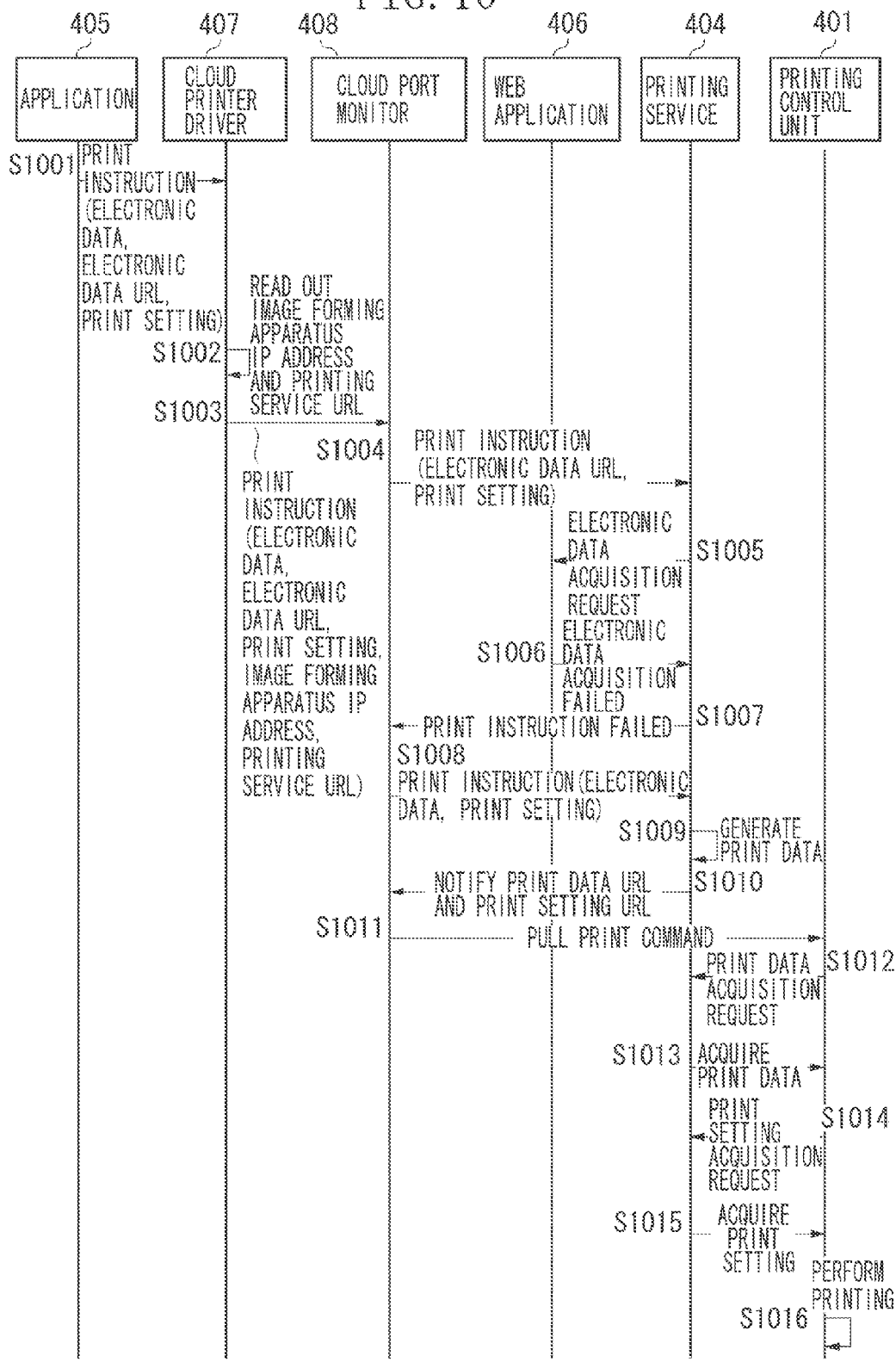

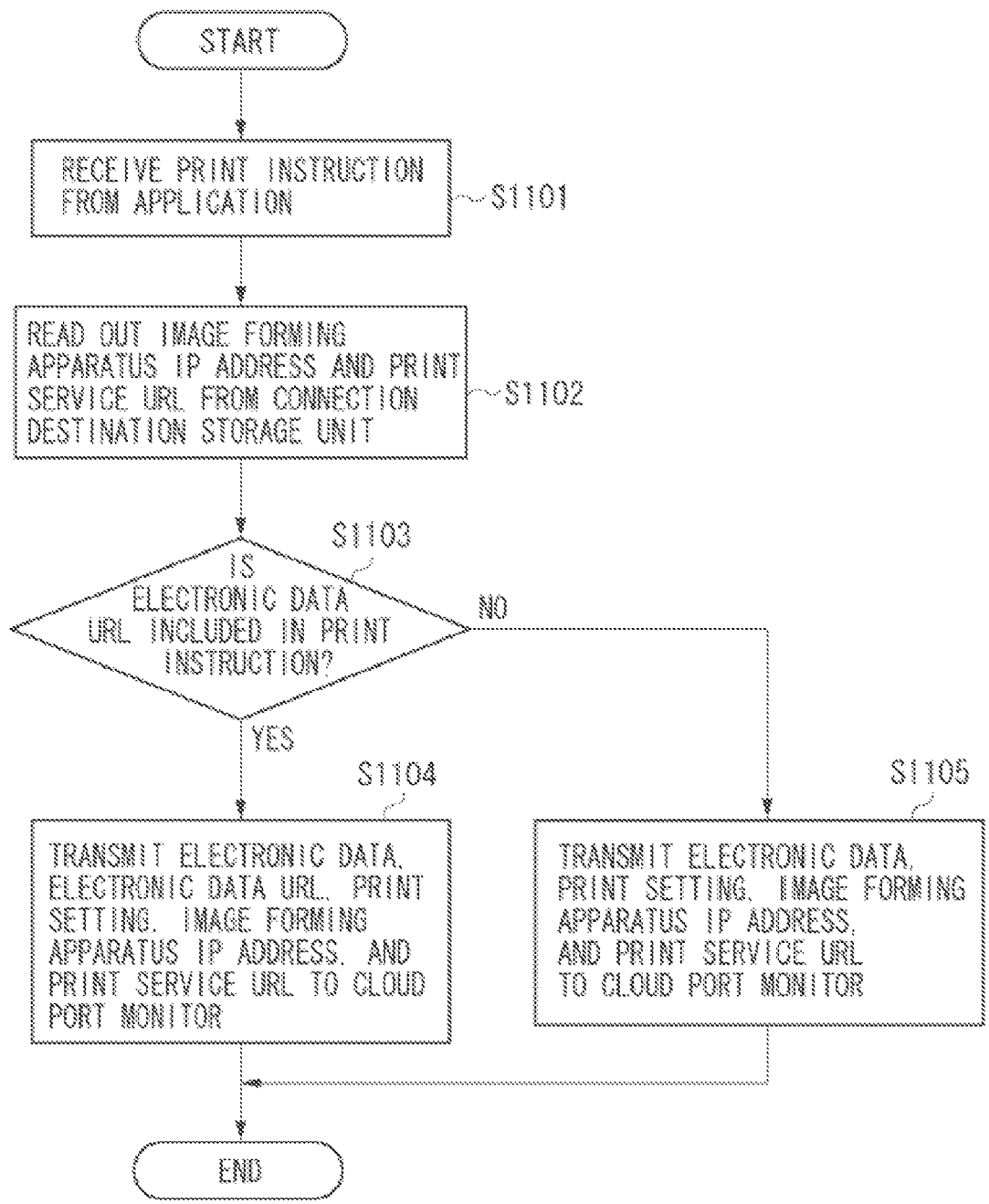

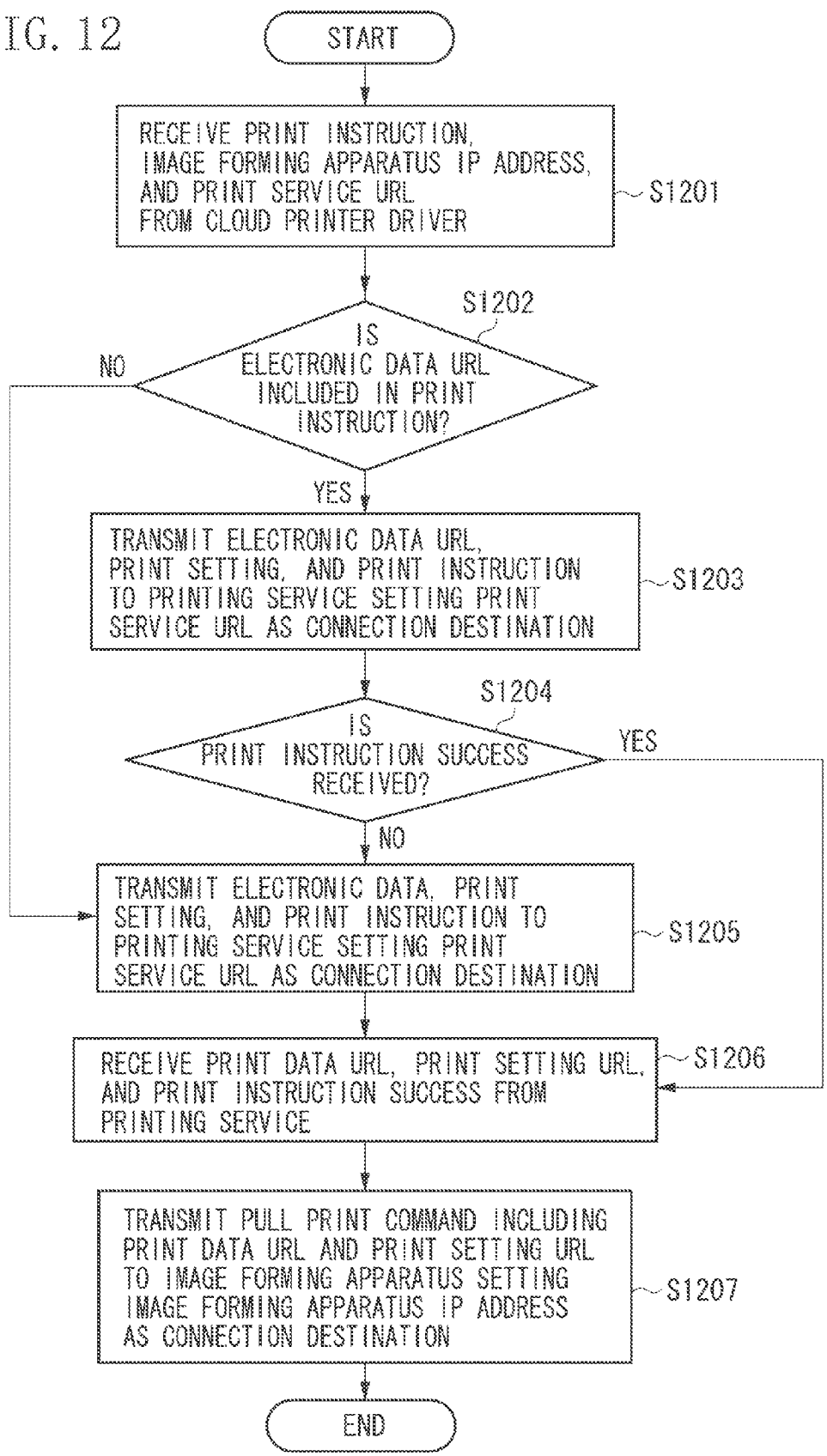

INFORMATION PROCESSING APPARATUS, METHOD FOR CONTROLLING THE SAME, AND STORAGE MEDIUM

BACKGROUND OF THE INVENTION

1. Field of the Invention

The present invention relates to an information processing apparatus for instructing printing using a printer driver, a method for controlling the information processing apparatus, and a storage medium.

2. Description of the Related Art

As a conventional technique, an application installed on an information processing apparatus transmits a print instruction to a printer driver which, upon reception of the print instruction, converts electronic data, which are print target, into print data. As another conventional technique, a printer driver transmits a print instruction to a port monitor which, upon reception of the print instruction, transmits print data to an image forming apparatus.

FIG. 1 illustrates a conventional sequence in which an application of an information processing apparatus instructs an image forming apparatus to perform printing. A user creates a document by the application and then instructs printing. In step S101, the application transmits electronic data of the document (hereinafter referred to as document electronic data) and a print instruction to a printer driver. In step S102, the printer driver receives the document electronic data and converts the document electronic data to generate print data. In step S103, the printer driver reads the IP address of the image forming apparatus from a connection destination storage unit of the information processing apparatus. In step S104, the printer driver transmits a print instruction together with the print data and the IP address of the image forming apparatus to a port monitor. In step S105, the port monitor transmits a print instruction to a printing control unit of the image forming apparatus designating the received IP address of the image forming apparatus as a connection destination. In step S106, the printing control unit performs printing and the document is printed.

The printer driver is a very useful program for the user to acquire a print product. A certain technique improves such a printer driver into a more convenient program. Japanese Patent Application Laid-Open No. 2009-301127 discusses a common printer driver which is applicable to a plurality of models of image forming apparatuses and executes printing instruction to these image forming apparatuses. The printer driver discussed in Japanese Patent Application Laid-Open No. 2009-301127 can use a plurality of image forming apparatuses as a connection destination. The printer driver discussed in Japanese Patent Application Laid-Open No. 2009-301127 creates and displays a setting screen based on product information for the image forming apparatuses and user-definable attribute information for the image forming apparatuses.

In recent years, a technique called cloud computing system has come to be used as a configuration for performing various pieces of processing on the server computer side. With the cloud computing system, a user utilizes a web application on the server side by a web browser installed on the client side to create and edit a document. When printing the document, the document electronic data is converted into print data on the server side, so that the user can print the document without installing a printer driver on the client side.

None of conventional printer drivers recognizes a printing service as a connection destination. In other words, a user cannot perform cloud-based printing via a conventional printer driver from an application installed on an information processing apparatus. Another problem is an assumed user demand for cloud-based printing with a similar feeling of operation to that of the conventional printer driver-based printing method.

Still another problem is that, when using a plurality of models of image forming apparatuses, it is necessary to install the same number of printer drivers as the number of image forming apparatuses. However, installing a number of printer drivers may cause competition therebetween possibly resulting in an unstable state of an operating system. For example, temporary data that cannot be normally deleted may disturb normal operation of the operating system.

SUMMARY OF THE INVENTION

The present invention is directed to providing a printer driver and a port monitor for achieving printing utilizing printing service.

The present invention is also directed to providing a printer driver and a port monitor which do not need to be installed for each image forming apparatus.

According to an aspect of the present invention, an information processing apparatus includes a printer driver configured to recognize a printing service of a printing server as a connection destination, a port monitor, wherein the port monitor includes: a transmission unit configured to receive, from the printer driver, electronic data, specific information corresponding to an image forming apparatus specified at a time of the print instruction, and a printing server uniform resource identifier (URI), and to transmit the electronic data to the printing server, a reception unit configured to receive a print data URI from the printing server, and a pull print command transmission unit configured to transmit a pull print command including the print data URI received by the reception unit to the image forming apparatus based on the specific information, and a control unit configured to control the print driver and the port monitor, wherein the control unit causes, after a print instruction is made to electronic data edited through an application installed on the information processing apparatus and before the transmission unit receives the electronic data from the printer driver, the printer driver to receive the electronic data from the application and to refrain from performing processing to convert the received electronic data into print data, and wherein the control unit causes the transmission unit to transmit, before the electronic data is converted into print data, the electronic data received from printer driver to the printing server based on the received printing server URI and causes the printing server to convert the electronic data transmitted by the transmission unit into print data and a print data URI associated with the print data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates information stored by a connection destination storage unit according to the first exemplary embodiment.

FIGS. 8A to 8D illustrate pieces of notification information expressed in the XML format according to the first exemplary embodiment.

FIG. 9 is a sequence diagram illustrating a cloud printing sequence according to the first exemplary embodiment.

FIG. 10 is a sequence diagram illustrating a cloud printing sequence according to a second exemplary embodiment.

FIG. 11 is a flow chart performed by a cloud printer driver according to the second exemplary embodiment.

FIG. 12 is a flow chart performed by a cloud port monitor according to the second exemplary embodiment.

DESCRIPTION OF THE EMBODIMENTS

Various exemplary embodiments, features, and aspects of the invention will be described in detail below with reference to the drawings.

Figure 2:
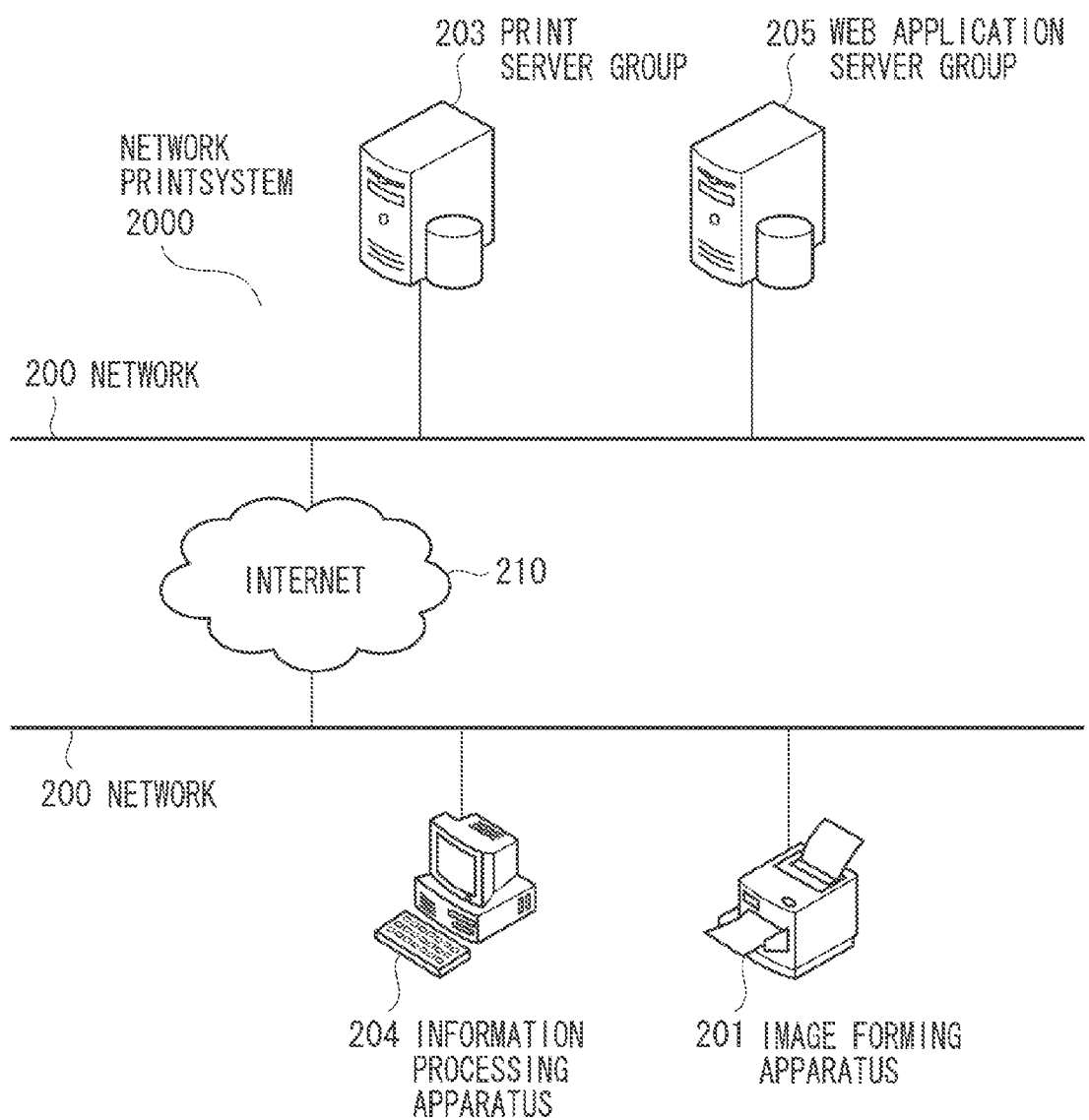
FIG. 2 illustrates a configuration of a network print system according to a first exemplary embodiment.

A first exemplary embodiment will be described below. A configuration of a network print system 2000 according to the first exemplary embodiment will be described below with reference to FIG. 2. The network print system 2000 includes an information processing apparatus 204 and an image forming apparatus 201. These two apparatuses are installed in a user environment and interconnected via a network 200 which is connected to the Internet 210. The network print system 2000 further includes a web application server group 205 and a printing server group 203. These two server groups are interconnected via the network 200 which is connected to the Internet 210. Although the two server groups are interconnected via the network 200 in the first exemplary embodiment, the two server groups may be interconnected via the Internet 210. Apparatuses and server groups constituting the network print system 2000 are interconnectable and capable of data communication therebetween via the Internet 210. Although FIG. 2 illustrates one unit of each apparatus, the network print system 2000 may include a plurality of units of each apparatus. Although each server group includes a plurality of server machines, it may include only one server machine.

Figure 3:
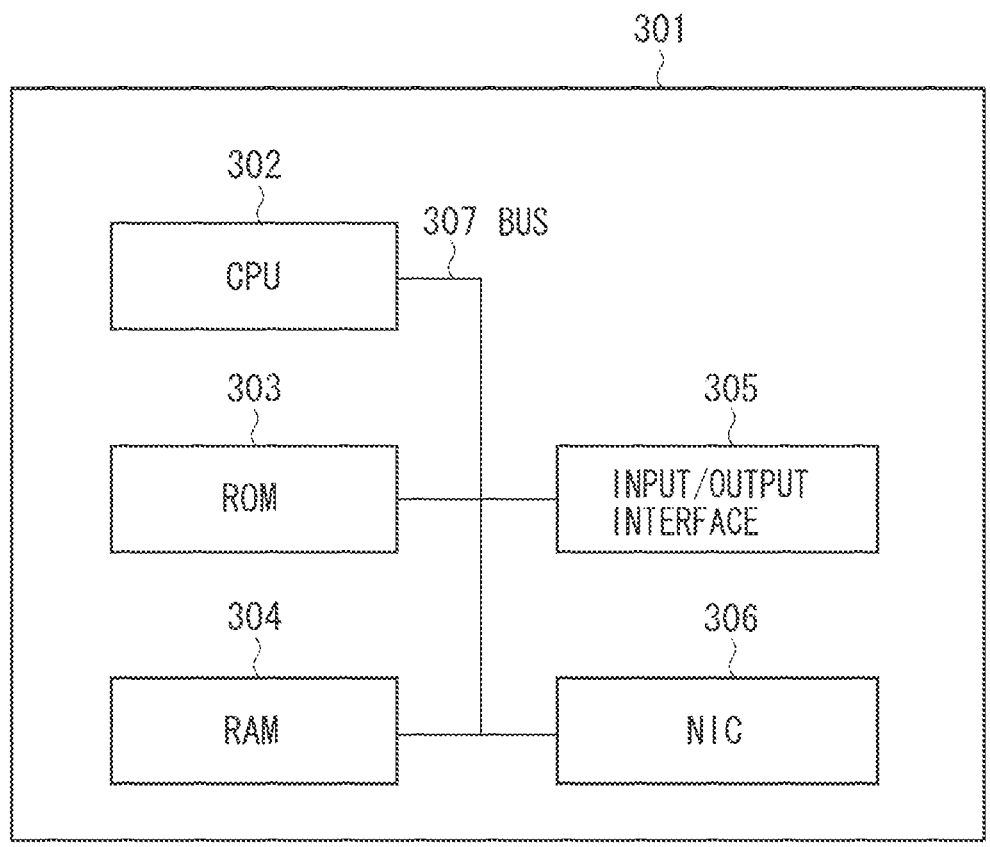
FIG. 3 illustrates a hardware configuration of each apparatus and each server group constituting the network print system according to the first exemplary embodiment.

A hardware configuration of each apparatus and each server group constituting the network print system 2000 will be described below with reference to FIG. 3. Each unit 301 of apparatuses and server groups constituting the network print system 2000 includes a central processing unit (CPU) 302, a read only memory (ROM) 303, a random access memory (RAM) 304, an input/output interface 305, and a network interface card (NIC) 306. The CPU 302 executes various programs to achieve various functions. The ROM 303 stores various programs. The CPU 302 loads a program from the ROM 303 into the RAM 304 and then executes it. The RAM 304 is used also as a temporary working storage area for the CPU 302. The input/output interface 305 serves as an interface unit to transmit data to a display (not illustrated) connected to each apparatus and each server group, and receive data from a pointing device (not illustrated). The NIC 306 connects each apparatus and each server group constituting the network print system 2000 to the network 200. The above mentioned units can transmit and receive data via a bus 307. The image forming apparatus 201 has a printing unit (not illustrated) which can transmit and receive data to/from each unit via the bus 307. The printing unit can print a raster image onto a recording medium.

Figure 1:
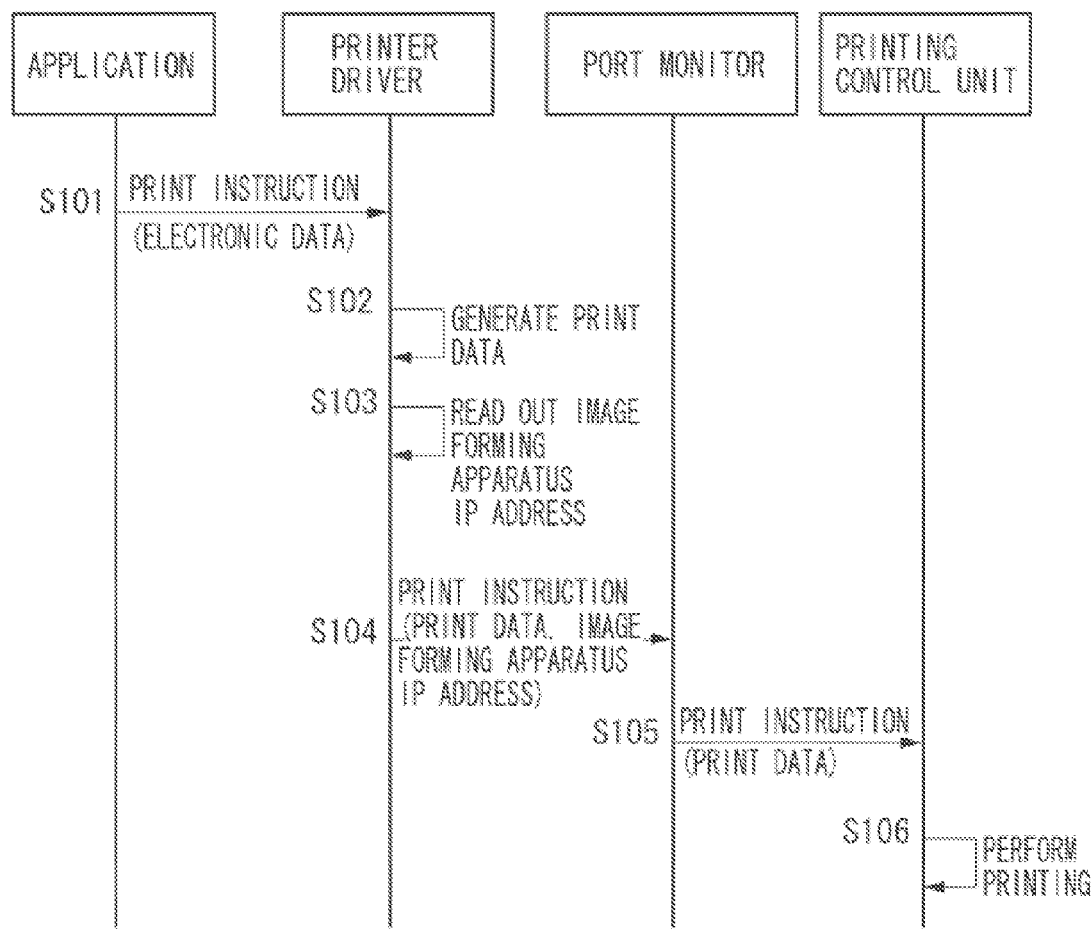
FIG. 1 is a sequence diagram illustrating a conventional network printing sequence.
Figure 4:
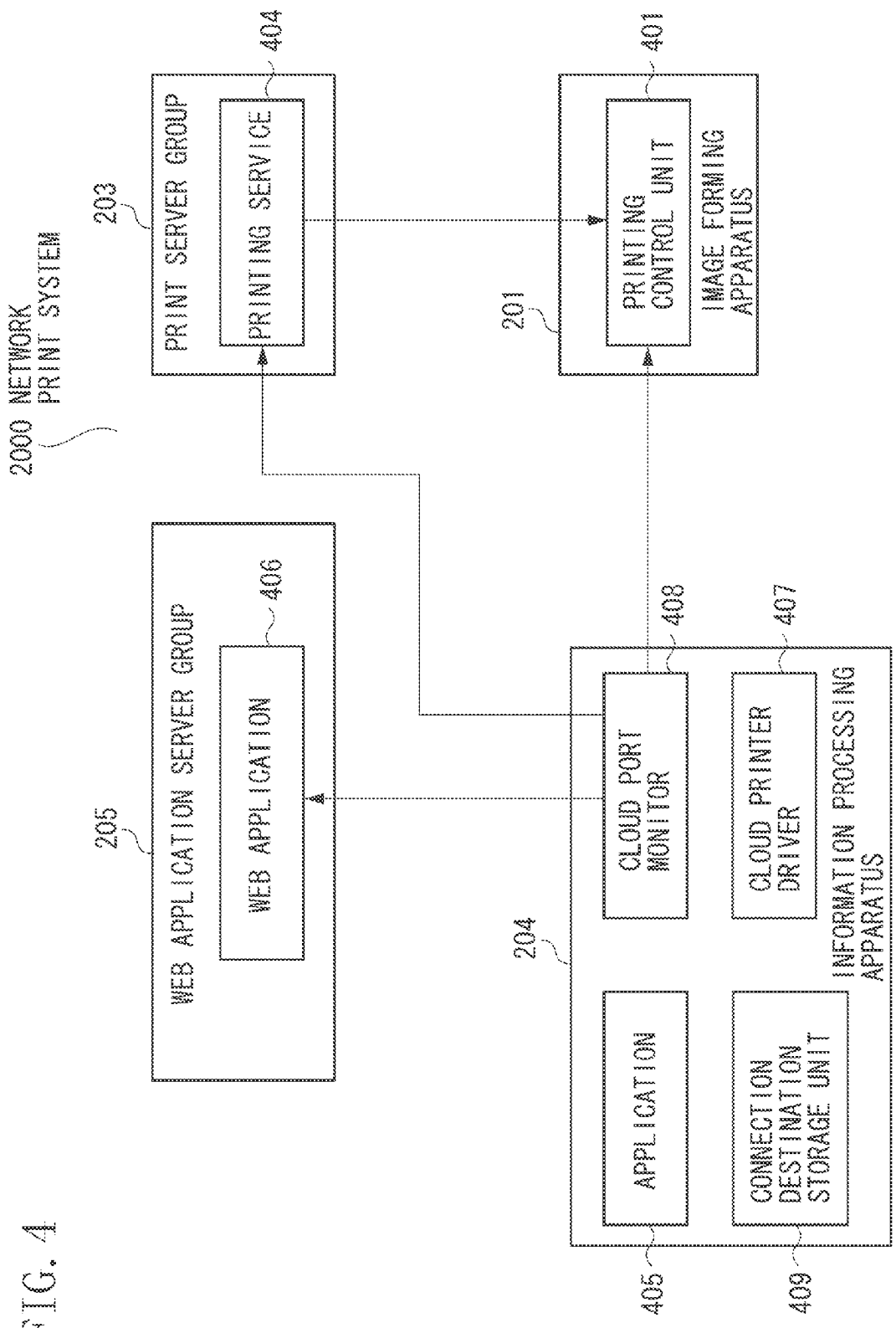
FIG. 4 illustrates a software configuration of each apparatus and each server group constituting the network print system according to the first exemplary embodiment.

A function of each apparatus and each server group constituting the network print system 2000 will be described below. FIG. 4 illustrates a software configuration of each apparatus and each server group constituting the network print system 2000. Programs for achieving software functions illustrated in FIG. 4 are stored in the ROM 303 of each apparatus and each server group. The CPU 302 loads a necessary program into the RAM 304 and then executes it to achieve a relevant function. Specifically, functions of each apparatus and each server group are achieved by each apparatus having computer functions described in FIG. 1.

Functions of each apparatus and each server group will be described below. Functions of the image forming apparatus 201 will be described below. The image forming apparatus 201 is a cloud printer. A cloud printer is an image forming apparatus which receives a pull print command from an external apparatus and interprets the pull print command. A cloud printer is also an image forming apparatus which transmits a print data acquisition request to a print data storage location included in the pull print command. Then, the cloud printer acquires the print data from the print data storage location and then performs printing. The print data storage location is specified by a universal resource locator (URL). However, the notation is not limited to URL, but may be any other notations for specifying a resource on the web such as a uniform resource identifier (URI).

Figure 5:
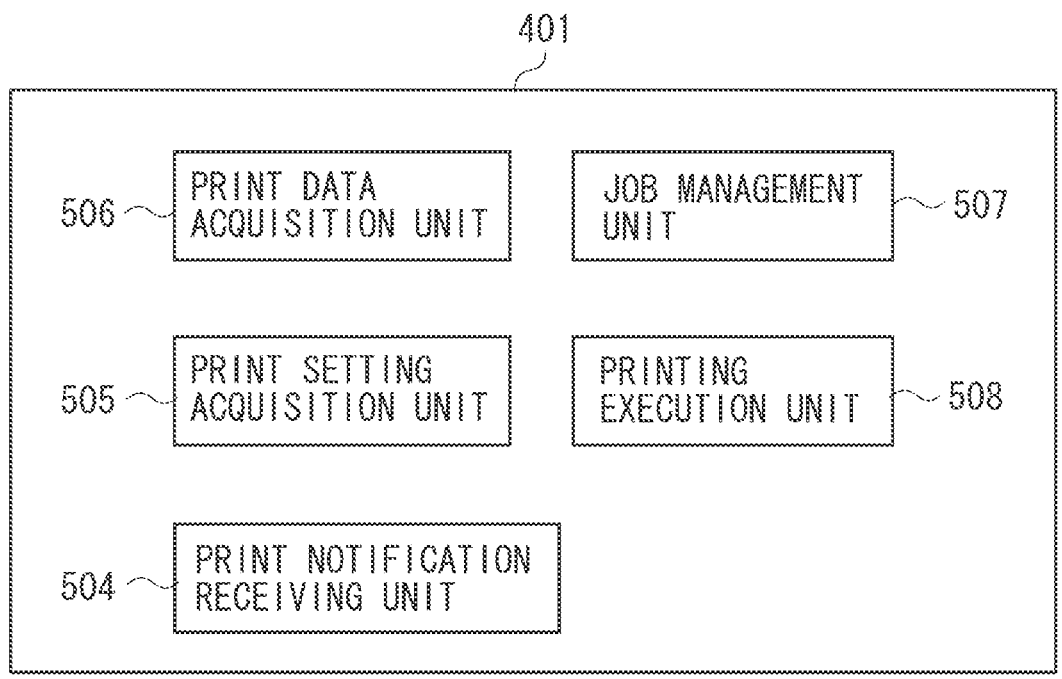
FIG. 5 illustrates functions achieved by a printing control unit according to the first exemplary embodiment.
Figure 6:
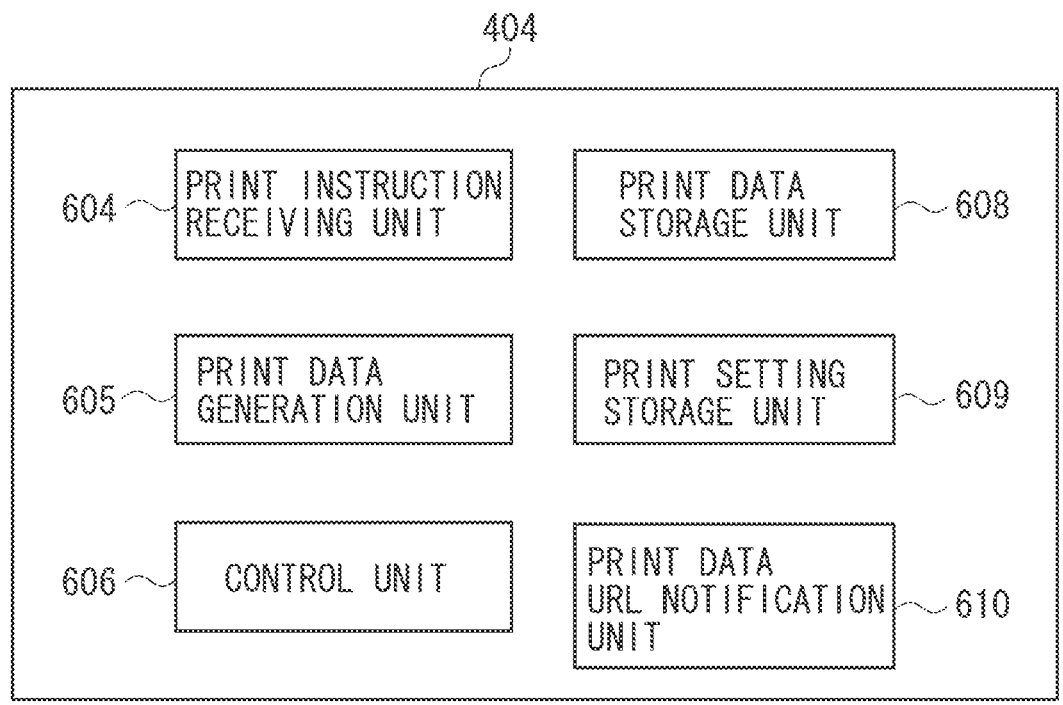
FIG. 6 illustrates functions achieved by a printing service according to the first exemplary embodiment.

The printing control unit 401 included in the image forming apparatus 201 includes a print notification receiving unit 504 illustrated in FIG. 5. The print notification receiving unit 504 receives a pull print command transmitted from a cloud port monitor 408. The print notification receiving unit 504 identifies a print data storage location and a print setting storage location described in the pull print command, and notifies the print setting storage location and the print data storage location to a print setting acquisition unit 505 and a print data acquisition unit 506, respectively. Based on the notified print setting storage location, the print setting acquisition unit 505 acquires a relevant print setting from a print setting storage unit 609 illustrated in FIG. 6. Based on the notified print data storage location, the print data acquisition unit 506 acquires relevant print data from a print data storage unit 608. The acquired print setting and print data are transmitted to a job management unit 507 via the print notification receiving unit 504. The job management unit 507 acquires the print data and the print setting and instructs a printing execution unit 508 to perform printing. Upon reception of the print instruction, the printing execution unit 508 generates a raster image based on the acquired print setting and print data, and instructs the printing unit to print the generated raster image.

Functions of the information processing apparatus 204 will be described below. The information processing apparatus 204 includes a conventional printer driver (not illustrated) and a cloud printer driver 407. When the conventional printer driver receives a document print instruction from an application 405, the conventional printer driver converts an electronic data of the document specified in the print instruction into print data. Then, the conventional printer driver reads information (IP address) corresponding to the image forming apparatus 201 from a connection destination storage unit 409, and instructs a conventional port monitor to perform printing. On the other hand, when the cloud printer driver 407 receives a document print instruction from the application 405, the cloud printer driver 407 does not convert an electronic data of the document specified in the print instruction into print data. Then, the cloud printer driver 407 reads out the IP address of the image forming apparatus 201 and the URL of a printing service 404 from the connection destination storage unit 409, and transmits them to the cloud port monitor 408 to instruct printing.

The information processing apparatus 204 includes the application 405. The applications 405 according to the present exemplary embodiment is, for example, document editing software or spreadsheet software capable of instructing the cloud port monitor 408 to print a document created by the application 405. The electronic data of the document specified in the print instruction is transmitted to the cloud printer driver 407. The application 405 displays a list of printers (hereinafter referred to as printer list) usable by a user. The printer list displays printers related to conventional printer drivers and cloud printers related to the cloud printer driver 407. The cloud printer driver 407 displays a print setting screen corresponding to a printer selected in the printer list by the user. Since the print setting screen is assumed to correspond to a plurality of cloud printers, it enables only general print setting but does not enable print setting specific to each individual image forming apparatus. The application 405 transmits to the cloud printer driver 407 a print setting set in the print setting screen by the user.

The cloud printer driver 407 receives a print instruction from the application 405 and then transmits a print instruction to the cloud port monitor 408. The cloud printer driver 407 is a printer driver applicable to the image forming apparatus 201. The cloud printer driver 407 reads out the IP address of the image forming apparatus 201 and the URL of the printing service 404 from the connection destination storage unit 409 to achieve cloud printing using the printing service 404. The cloud printer driver 407 does not perform processing for converting the electronic data of the document into print data, and is displayed as an option when the application 405 instructs printing. When the user installs the cloud printer driver 407, the cloud printer driver 407 stores in the connection destination storage unit 409 the IP address of the image forming apparatus 201 and the URL of the printing service 404 as a connection destination.

Information stored in the connection destination storage unit 409 will be described below with reference to FIG. 7. A driver type 701 indicates whether a relevant driver is a conventional printer driver or a cloud printer driver. An image forming apparatus IP address 702 indicating the IP address of the image forming apparatus 201 is used when the cloud port monitor 408 transmits a pull print command to the image forming apparatus 201. A printing service URL 703 indicating the URL of the printing service 404 is used when the cloud port monitor 408 transmits a print data conversion instruction to the printing service 404. The printing service URL 703 is used only by the cloud printer driver 407 and not used by conventional printer drivers. When a printing instruction is made through the application 405, the cloud printer driver 407 acquires the IP address of the image forming apparatus 201 and the URL of the printing service 404 from the connection destination storage unit 409. The cloud printer driver 407 transmits to the cloud port monitor 408 the electronic data of the document specified in the print instruction through the application 405, a print setting, the IP address of the image forming apparatus 201, and the URL of the printing service 404. The cloud printer driver 407 has a function of generating a print setting screen similar to the conventional printer driver, and a function of generating a print setting based on a setting specified by the user via the print setting screen. The cloud printer driver 407 according to the first exemplary embodiment generates a print setting not in DEVMODE but in the tag format (for example, XML format) (described below).

Based on the URL of the printing service 404 received from the cloud printer driver 407, the cloud port monitor 408 transmits the document electronic data and the print setting to the printing service 404. In the present exemplary embodiment, the cloud port monitor 408 transmits the print setting using notification information as shown in FIG. 8A. The print setting is described in the XML format. Referring to FIG. 8A, a line 801 indicates the one-sided setting and a line 802 indicates the A4 paper size setting. The cloud port monitor 408 transmits the electronic data of the document using the notification information as shown in FIG. 8B. Referring to FIG. 8B, a line 803 ([Data]) indicates the electronic data of the document to be transmitted in the binary format. Since document electronic data is generally larger than a size that can be transmitted by one packet, the cloud port monitor 408 transmits document electronic data using the HTTP chunk format.

After the printing service 404 converts the electronic data of the document into print data, the cloud port monitor 408 receives the URL of the print data as notification information as shown in FIG. 8C. Referring to FIG. 8C, a line 804 indicates the URL where the print data is stored, and a line 805 indicates the URL where the print setting is stored. Setting the IP address of the image forming apparatus 201 (received from the cloud printer driver 407) as a connection destination, the cloud port monitor 408 transmits to the image forming apparatus 201 a pull print command as shown in FIG. 8D including the URL of the print data and the URL of the print setting. Referring to FIG. 8D, a line 806 indicates the URL of the print data and a line 807 indicates the URL of the print setting. Although the first exemplary embodiment handles the notification information as shown in FIGS. 8A to 8D, it may also handle other information and data depending on communication specifications. This also applies to other notification information described below. This completes the explanation of the application 405, the cloud printer driver 407, the cloud port monitor 408, and the connection destination storage unit 409 included in the information processing apparatus 204.

Functions of the printing server group 203 will be described below. The printing service 404 included in the printing server group 203 includes a print instruction receiving unit 604. The print instruction receiving unit 604 receives a print setting (set up via the print setting screen by the user) and an electronic data of a document from the cloud port monitor 408.

A print data generation unit 605 receives a user-input print setting from the print instruction receiving unit 604. Based on the document electronic data and the print setting acquired from the cloud port monitor 408, the print data generation unit 605 converts the electronic data of the document into print data. A control unit 606 acquires the print data and the print setting from the print data generation unit 605.

The printing service 404 includes the print data storage unit 608, the print setting storage unit 609, and a print data URL notification unit 610. The print data storage unit 608 receives and stores the print data from the control unit 606. The print setting storage unit 609 receives and stores the print setting from the control unit 606. Each of the print data storage unit 608 and the print setting storage unit 609 receives a storage instruction from the control unit 606 and performs storage processing. When the print setting storage unit 609 receives notifications that the print data and the print setting is stored from the print data storage unit 608 and the print setting storage unit 609, respectively, the control unit 606 instructs the print data URL notification unit 610 to transmit notification information to the cloud port monitor 408. The print data URL notification unit 610 acquires the print data storage location and the print setting from the control unit 606, generates notification information including the URL of the print data and the URL of the print setting, and transmits the notification information to the cloud port monitor 408.

This completes the explanation of the process in which a document print instruction created by the application 405 is transmitted to the printing server group 203 and the image forming apparatus 201 is instructed (specified at the time of print instruction) to print the print data stored in the printing server group 203.

The sequence for transmitting a document print instruction generated by the application 405 to the printing server group 203 and instructing the image forming apparatus 201 to print the print data stored in the printing server group 203 will be described below with reference to FIG. 9. In step S901, the application 405 transmits document electronic data, a print setting, and a print instruction to the cloud printer driver 407. The above-mentioned processing is started when a print instruction is made to a document edited through the application 405 installed on the information processing apparatus 204. In step S902, the cloud printer driver 407 reads out from the connection destination storage unit 409 the IP address of the image forming apparatus 201 and the URL of the printing service 404 specified in the print instruction. In step S903, the cloud printer driver 407 transmits a print instruction together with the electronic data of the document, the print setting, the IP address of the image forming apparatus 201, and the URL of the printing service 404, to the cloud port monitor 408. In step S904, the cloud port monitor 408 receives the electronic data of the document, the print setting, the IP address of the image forming apparatus 201, and the URL of the printing service 404. The cloud port monitor 408 transmits the electronic data of the document, the print setting, and a print instruction to the printing service 404 setting the received URL of the printing service 404 as a connection destination.

In step S905, the printing service 404 converts the electronic data of the document into print data. In step S906, the printing service 404 notifies the URL of the print data and the URL of the print setting to the cloud port monitor 408. In step S907, the cloud port monitor 408 transmits a pull print command including the URL of the print data and the URL of the print setting to the printing control unit 401 setting the IP address of the image forming apparatus 201 (received in step S903) as a connection destination. The function of achieving this transmission processing corresponds to a pull print command transmission unit. In step S908, the printing control unit 401 requests the printing service 404 for print data acquisition. In step S909, the printing control unit 401 acquires the print data from the printing service 404. In step S910, the printing control unit 401 requests the printing service 404 for print setting acquisition. In step S911, the printing control unit 401 acquires the print setting from the printing service 404. In step S912, the printing control unit 401 draws a raster image based on the acquired print data and print setting, and instructs the image forming apparatus 201 to print the raster image.

The cloud port monitor 408 may transmit the print setting directly to the printing control unit 401. In this case, in step S904.5 (a step after step S904), the cloud port monitor 408 transmits the print setting and a print instruction to the printing control unit 401 setting the IP address of the image forming apparatus 201 as a connection destination. The cloud port monitor 408 transmits a print instruction including the print setting to the printing control unit 401 using the notification information as shown in FIG. 8A. In this direct processing, steps S910 and S911 in FIG. 9 are not necessary and the printing control unit 401 does not need to acquire the print setting from the printing service 404.

The above-mentioned configuration achieves the following effects. Specifically, since a printer driver and a port monitor can recognize the printing service as a connection destination, cloud-based printing can be performed from an application with conventional procedures. Moreover, it becomes unnecessary to install a printer driver for each image forming apparatus, so that there is no need to update a printer driver for each image forming apparatus. Still another effect is that it becomes unnecessary to install a printer driver for a printer for temporary use, so that the possibility of occurrence of competition between printer drivers can be reduced.

A second exemplary embodiment will be described below. In the first exemplary embodiment, the application 405 is assumed to be document creation software installed on the information processing apparatus 204. However, a document creation service may exist in the web application server group 205. In the second exemplary embodiment, the application 405 is assumed to be a web browser used to print a document created by the web application server group 205. The web application server group 205 corresponds to a document editing server.

In the second exemplary embodiment, the web application server group 205 and the printing server group 203 are assumed to be supplied by different vendors. Therefore, a certain problem may arise. Specifically, when the printing server group 203 attempts to acquire electronic data of the document from the web application server group 205, the web application server group 205 may be unable to authenticate the request from the printing server group 203, and the authentication processing by the web application server group 205 fails. Causes of the authentication processing failure include a case where the document editing service, provided by the web application 406 included with the web application server group 205, rejects an access from different domains and a case where it rejects an access from unreliable servers. When the authentication fails, the printing server group 203 cannot acquire electronic data of the document directly from the web application server group 205. The second exemplary embodiment solves this problem by performing processing different from ordinary processing (i.e., in ordinary processing, the printing server group 203 acquires electronic data of the document from web application 406 of the web application server group 205). Specifically, this problem can be solved if the cloud port monitor 408 of the information processing apparatus 204 transmits the electronic data of the document, created by the web application server group 205, to the printing service group 103.

Functions of each apparatus and each server group according to the second exemplary embodiment will be described below. First, functions included in the image forming apparatus 201 are described. Functions of the image forming apparatus 201 are similar to those in the first exemplary embodiment.

Functions of the information processing apparatus 204 will be described below. The information processing apparatus 204 includes the application 405. The application 405 according to the second exemplary embodiment is a web browser and is software capable of transmitting a print instruction to a document stored in the web application server group 205. The application 405 transmits an electronic data of a document, the URL of the electronic data of the document, and a print setting to the cloud printer driver 407. Other functions of the application 405 are similar to those in the first exemplary embodiment.

The cloud printer driver 407 transmits the electronic data of the document specified in the print instruction through the application 405, the URL of the document electronic data, the print setting, the IP address of the image forming apparatus 201, and the URL of the printing service 404 to the cloud port monitor 408. Other functions of the cloud printer driver 407 are similar to those in the first exemplary embodiment.

The cloud port monitor 408 determines whether the URL of the document electronic data is included in the data received from the cloud printer driver 407. When the cloud port monitor 408 determines that the URL of the electronic data of the document is included in the data, the cloud port monitor 408 transmits the URL of the document electronic data, the print setting, and a print instruction to the printing service 404 setting the URL of the printing service 404 as a connection destination. When the cloud port monitor 408 determines that the URL of the document electronic data is not included in the data, the cloud port monitor 408 performs similar processing to that in the first exemplary embodiment. When the cloud port monitor 408 receives a print instruction failure from the printing service 404, the cloud port monitor 408 transmits the document electronic data, the print setting, and a print instruction to the printing service 404 setting the URL of the printing service 404 as a connection destination. Other functions of the cloud port monitor 408 are similar to those in the first exemplary embodiment. This completes the explanation of the application 405, the cloud printer driver 407, the cloud port monitor 408, and the connection destination storage unit 409 included in the information processing apparatus 204.

Functions of the web application server group 205 will be described below. The web application server group 205 includes a web application 406 to provide a document editing service using the web application 406. The web application server group 205 includes a plurality of machines which serve as one virtualized server to achieve functions of the web application 406. The web application server group 205 activates the plurality of virtual machines in the one server to achieve functions of the web application 406 for each individual virtual machine.

The web application 406 provides a document creation service. For example, when a user wants to distribute a document for a company meeting, the user utilizes the document creation service to create the document. When the information processing apparatus 204 utilizes the web application 406, the information processing apparatus 204 need to just have the application 405 but do not need to install the application 406. The application 405 according to the second exemplary embodiment is a web browser. The web application 406 transmits screen information for creating the document to the application 405. The web application 406 performs the authentication processing based on user information including a user ID and password input by the user through the application 405 and, in response to the success of the authentication processing, transmits the screen information for creating the document. When the application 405 receives the screen information, the application 405 displays a creation screen for creating a document based on the screen information. The user creates the document to be distributed at a meeting using the creation screen. The web application 406 receives information about the document created by the user using the creation screen, creates the document based on the received information, and stores the created document in a storage unit of the web application server group 205. The web application 406 provides not only the document creation service but also mail service and schedule service.

When the user wants to print a document created by the document creation service, the user presses a print button displayed on the creation screen. The web application 406 receives information notifying that the print button is pressed and transmits the document electronic data and the URL of the document electronic data to the application 405. When the web application 406 receives a document acquisition request from the printing service 404, the web application 406 transmits a target document to the printing service 404. The web application 406 identifies authentication information of the acquisition request and, when it determines that the acquisition request is not permitted, it transmits an acquisition request failure to the printing service 404. This completes the explanation of the web application 406 included in the web application server group 205.

Functions included in the printing server group 203 will be described below. The printing server group 203 receives the print instruction together with the URL of the electronic data of the document and the print setting from the cloud port monitor 408. The printing server group 203 transmits an electronic data of a document acquisition request to the web application 406 setting the URL of the electronic data of the document as a connection destination. When the electronic data of the document is acquired, the printing server group 203 coverts the electronic data of the document into print data. When the printing server group 203 fails to acquire the electronic data of the document, the printing server group 203 transmits a print instruction failure to the cloud port monitor 408. Other functions of the printing server group 203 are similar to those in the first exemplary embodiment.

This completes the explanation of the sequence for transmitting a document print instruction generated by the web application server group 205 to the printing server group 203 and instructing the image forming apparatus 201 to print the print data stored in the printing server group 203.

Next, the sequence for transmitting a document print instruction, generated by the web application server group 205, to the printing server group 203 and instructing the image forming apparatus 201 to print the print data stored in the printing server group 203 will be described below with reference to FIG. 10. In step S1001, the application 405 transmits a print instruction together with the electronic data of the document, the URL of the electronic data of the document in the web application server group 205, and the print setting to the cloud printer driver 407. In step S1002, the cloud printer driver 407 reads out the IP address of the image forming apparatus 201 and the URL of the printing service 404 of the printing server group 203 from the connection destination storage unit 409.

In step S1003, the cloud printer driver 407 transmits (i) a print instruction together with (ii) the electronic data of the document, (iii) the URL of the electronic data of the document in the web application server group 205, (iv) the print setting, (v) the IP address of the image forming apparatus 201, and (vi) the URL of the printing service 404 to the cloud port monitor 408. In step S1004, the cloud port monitor 408 transmits the URL of the electronic data of the document, the print setting, and a print instruction to the printing service 404 of the printing server group 203, wherein the cloud port monitor 408 sets the URL of the electronic data of the document, received by the printing service 404, as a connection destination. In step S1005, the printing service 404 transmits an acquisition request to acquire electronic data of a document to the web application 406, wherein the printing service 404 sets the URL of the document electronic data as a connection destination. In step S1006, the web application 406 performs authentication processing for the electronic data acquisition request. In a case where the authentication by web application 406 for the electronic data acquisition request from the printing service 404 fails the authentication processing, the printing service 404 is unable to acquire the electronic data of the document from the web application 406. In this fail case, the web application 406 transmits an electronic data acquisition request failure to the printing service 404 of the printing server group 203 in step S1006. In step S1007, as a response to the print instruction in step S1004, the printing service 404 transmits a print instruction failure to the cloud port monitor 408. In step S1008, the cloud port monitor 408 transmits a print instruction together with the electronic data of the document and the print setting to the printing service 404. Here, the cloud port monitor 408 of the information processing apparatus 204 transmitting the electronic data of the document, created by the web application server group 205, to the printing service group 103 addresses a failed authentication case. In step S1009, the printing service 404 converts the electronic data of the document, received from the cloud port monitor 408, into print data. In step S1010 of FIG. 10, the printing service 404 notifies the print data URL and the print setting URL to the cloud port monitor 408. In step S1011, the cloud port monitor 408 sends a pull print command to the printing control unit 401. In step S1012, the printing control unit 401 sends the printing service 404 a print data acquisition request. In step S1013, the printing service 404 sends the print data to the printing control unit 401. In step S1014, the printing control unit 401 sends the printing service 404 a print setting acquisition request. In step S1015, the printing service 404 sends the print setting to the printing control unit 401. In step S1016, the printing control unit 401 performs printing.

The above described a case for step S1006 where the authentication by web application 406 for the electronic data acquisition request from the printing service 404 fails the authentication processing. In a case for step S1006 where the web application 406 authenticates the electronic data acquisition request and, when the authentication processing is succeeded, the web application 406 transmits the document electronic data to the printing service 404, and the processing proceeds from step S1006 to step S1009. For example, when the web application server group 205 and the printing server group 203 are supplied by the same vendor, the web application 406 succeeds in the authentication processing for the electronic data acquisition request received from the printing service 404. In addition, when the web application server group 205 and the printing server group 203 are integrated into one server group, the sequence is the same as the case where the authentication processing is succeeded. In this case, the printing service 404 can acquire an electronic data of a document from the web application 406 without authentication information.

Then, the flow chart of the cloud printer driver 407 will be described below with reference to FIG. 11. In step S1101, the cloud printer driver 407 receives a print instruction from the application 405. In step S1102, the cloud printer driver 407 reads out the IP address of the image forming apparatus 201 and the URL of the printing service 404 from the connection destination storage unit 409. In step S1103, the cloud printer driver 407 determines whether the URL of the electronic data of the document is included in the print instruction. When the URL of the document electronic data is included in the print instruction (YES in step S1103), the processing proceeds to step S1104. In step S1104, the cloud printer driver 407 transmits the document electronic data, the URL of the document electronic data, a print setting, the IP address of the image forming apparatus 201, and the URL of the printing service 404 to the cloud port monitor 408. When the URL of the document electronic data is not included in the print instruction (NO in step S1103), the processing proceeds to step S1105. In step S1105, the cloud printer driver 407 transmits the document electronic data, the print setting, the IP address of the image forming apparatus 201, and the URL of the printing service 404 to the cloud port monitor 408, but not the URL of the document electronic data which was not included in the print instruction.

The flow chart of the cloud port monitor 408 will be described below with reference to FIG. 12. In step S1201, the cloud port monitor 408 receives the print instruction, the print setting, the IP address of the image forming apparatus 201, and the URL of the printing service 404 from the cloud printer driver 407. In step S1202, the cloud port monitor 408 determines whether the URL of the electronic data of the document is included in the print instruction. When the URL of the document electronic data is included in the print instruction (YES in step S1202), the processing proceeds to step S1203. In step S1203, the cloud port monitor 408 transmits a print instruction together with the URL of the document electronic data and the print setting to the printing service 404, wherein the cloud port monitor 408 sets the URL of the printing service 404 as a connection destination. In step S1204, the cloud port monitor 408 receives whether a print instruction succeeded or failed from the printing service 404. When the cloud port monitor 408 receives a print instruction failure (NO in step S1204), the processing proceeds to step S1205.

When the URL of the electronic data of the document is not included in the print instruction (NO in step S1202), the processing proceeds to step S1205. In step S1205, the cloud port monitor 408 transmits a print instruction together with the document electronic data and the print setting to the printing service 404, wherein the cloud port monitor 408 sets the URL of the printing service 404 as a connection destination. When the cloud port monitor 408 receives a print instruction success (YES in step S1204), the processing proceeds to step S1206. In step S1206, the cloud port monitor 408 receives a print instruction success together with the URL of the print data and the URL of the print setting from the printing service 404. In step S1207, the cloud port monitor 408 transmits a pull print command including the URL of the print data and the URL of the print setting to the image forming apparatus 201, wherein the cloud port monitor 408 sets the IP address of the image forming apparatus 201 as a connection destination.

The above-mentioned configuration gives the following effects. Specifically, since the printer driver and the port monitor can recognize the printing service as a connection destination, the user can perform cloud-based printing from the web browser in a similar way to the conventional procedures.

Moreover even when the printing server group 203 cannot acquire a document of the web application server group 205, a document generated by the web application server group 205 can be printed.

Other exemplary embodiment will be described below. Hereinafter processing for installing a cloud printer driver will be described. An information processing apparatus requests a cloud printer to transmit device information through the web service on device (WSD). The cloud printer transmits information indicating that it is a cloud printer to the information processing apparatus. When the information processing apparatus receives the information indicating it is the cloud printer, the information processing apparatus attempts to install a printer driver for the printer.

However, when the printer driver does not exist or the user does not request to install the printer driver, the cloud printer driver is installed as a driver applicable to the cloud printer. The cloud printer driver is installed based on the IP address of the cloud printer. After that, when the user installs a conventional printer driver applicable to the cloud printer using a CD-ROM, the cloud printer driver applicable to the cloud printer is deleted and then replaced by an ordinary printer driver. When deleting the cloud printer driver, the information processing apparatus recognizes the IP address of a printer on which the conventional printer driver is to be installed, and determines whether a cloud printer driver applicable to the IP address has already been installed. As a result of determination, if a cloud printer driver has already been installed, it is deleted and the conventional printer driver is installed.

For a printer that has come to be frequently used, the use of an ordinary printer driver is better than the use of a cloud printer driver. The reason is that, to utilize the printing service, the cloud printer driver needs to be accessed, for example, via the Internet requiring communication time and cost.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention. In an example, a computer-readable medium may store a program that causes an information processing apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-233581 filed Oct. 18, 2010, which is hereby incorporated by reference herein in its entirety.

What is claimed is:

1. An information processing apparatus for editing data provided by a document editing server using a web browser, the information processing apparatus comprising:
a processor coupled to a memory;
a printer driver configured to recognize a printing service of a printing server as a connection destination, to receive, from the web browser and after a print instruction is made to electronic data edited through the web browser, the electronic data and an electronic data uniform resource identifier (URI) to acquire the electronic data from the document editing server, and to transmit the received electronic data and the electronic data URI;
a transmission unit configured to receive, from the printer driver, the electronic data, the electronic data URI, specific information corresponding to an image forming apparatus specified at a time of print instruction, and a printing server URI, and to transmit the electronic data URI to the printing server based on the received printing server URI;
a reception unit configured to receive information from the printing server,
wherein, in a case where the reception unit receives information from the printing server indicating that the printing server is unable to acquire the electronic data from the document editing server in response to transmitting the electronic data URI to the document editing server, the transmission unit transmits a print instruction together with the electronic data to the printing service to cause the printing server to convert the electronic data, transmitted by the transmission unit, into print data and a print data URI associated with the print data, and the reception unit receives the print data URI from the printing server; and
a pull print command transmission unit configured to transmit a pull print command including the print data URI received by the reception unit to the image forming apparatus based on the specific information, and
wherein the processor implements at least one of the printer driver, the transmission unit, the reception unit, and the pull print command transmission unit.

2. The information processing apparatus according to claim 1, wherein, in a case where the printing server is able to acquire the electronic data from the document editing server in response to transmitting the electronic data URI to the document editing server, the reception unit does not receive information from the printing server indicating that the printing server is unable to acquire the electronic data from the document editing server.

3. The information processing apparatus according to claim 1, wherein the information, that was from the printing server indicating that the printing server is unable to acquire information received by the reception unit from the printing server, includes information about a failure of authentication processing performed in response to the printing server transmitting the electronic data URI to the document editing server.

4. The information processing apparatus according to claim 1, further comprising a determination unit configured to determine whether a URL of the electronic data is transmitted from the printer driver,
wherein, in response to the determination unit determining that the URL of the electronic data is not transmitted, the transmission unit transmits the electronic data received from the printer driver to the printing server based on the printing server URI, and
wherein the reception unit receives the print data URI from the printing server that converted the electronic data, transmitted by the transmission unit, into print data.

5. The information processing apparatus according to claim 1, further comprising a port monitor, wherein the transmission unit, the reception unit, and the pull print command transmission unit are included in the port monitor.

6. A method for controlling an information processing apparatus for editing data provided by a document editing server using a web browser and having a printer driver and a reception unit configured to receive information from a printing server, the method comprising:

recognizing, via the printer driver, a printing service of the printing server as a connection destination, receiving, from the web browser and after a print instruction is made to electronic data edited through the web browser, the electronic data and an electronic data uniform resource identifier (URI) to acquire the electronic data from the document editing server, and transmitting the received electronic data and the electronic data URI;

receiving, from the printer driver, the electronic data, the electronic data URI, specific information corresponding to an image forming apparatus specified at a time of print instruction, and a printing server URI, and transmitting the electronic data URI to the printing server based on the received printing server URI, wherein, in a case where the reception unit receives information from the printing server indicating that the printing server is unable to acquire the electronic data from the document editing server in response to transmitting the electronic data URI to the document editing server, transmitting includes transmitting a print instruction together with the electronic data to the printing service to cause the printing server to convert the electronic data, transmitted by the information processing apparatus, into print data and a print data URI associated with the print data, and the reception unit receives the print data URI from the printing server; and transmitting a pull print command including the print data URI received by the reception unit to the image forming apparatus based on the specific information.

7. A non-transitory computer-readable medium storing a program to cause a computer to perform a method for controlling an information processing apparatus for editing data provided by a document editing server using a web browser and having a printer driver and a reception unit configured to receive information from a printing server, the method comprising:

recognizing, via the printer driver, a printing service of the printing server as a connection destination, receiving, from the web browser and after a print instruction is made to electronic data edited through the web browser, the electronic data and an electronic data uniform resource identifier (URI) to acquire the electronic data from the document editing server, and transmitting the received electronic data and the electronic data URI;

receiving, from the printer driver, the electronic data, the electronic data URI, specific information corresponding to an image forming apparatus specified at a time of print instruction, and a printing server URI, and transmitting the electronic data URI to the printing server based on the received printing server URI, wherein, in a case where the reception unit receives information from the printing server indicating that the printing server is unable to acquire the electronic data from the document editing server in response to transmitting the electronic data URI to the document editing server, transmitting includes transmitting a print instruction together with the electronic data to the printing service to cause the printing server to convert the electronic data, transmitted by the information processing apparatus, into print data and a print data URI associated with the print data, and the reception unit receives the print data URI from the printing server; and transmitting a pull print command including the print data URI received by the reception unit to the image forming apparatus based on the specific information.

* * * * *